Patented Nov. 1, 1949

2,486,778

UNITED STATES PATENT OFFICE 2,486,778

PROCESS FOR THE SEPARATION OF ACID GASES FROM GASEOUS MIXTURES

Thomas F. Doumani, Los Angeles, Calif., assignor to Union Oil Company of California, Los Angeles, Calif., a corporation of California No Drawing. Application January 24, 1945, Serial No. 574,441

13 Claims. (Cl. 23—2)

This invention relates to the recovery of acid gases from mixtures of gases containing the same and is a continuation-in-part of application, Serial No. 407,240, filed August 16, 1941, now Patent No. 2,370,020, granted Feb. 20, 1945.

Many gases contain acidic gases, such as sulfur dioxide, hydrogen sulfide and carbon dioxide and the removal of these acidic gases is often highly desirable. Thus sulfur dioxide-containing gases obtained from the regeneration with air of catalysts employed in the catalytic treatment of sulfur-bearing petroleum fractions, from the burning of sulfide ores to oxides, as in smelting operations, the burning of high sulfur coals, etc., are often treated for the removal of sulfur dioxide. Some natural petroleum gases contain hydrogen sulfide and most petroleum refinery gases, such as particularly cracking still gases, also contain appreciable quantities of hydrogen sulfide. The removal of these acid gases from such gaseous mixtures is in some cases an economic necessity in order to reduce the corrosivity of the gas and in many instances the recovery of sulfur dioxide and/or hydrogen sulfide is important in itself because of the commercial value of these gases. Similarly, the separation of carbon dioxide from other gases is important in some industries. Thus, carbon dioxide is recovered from flue gases and other waste gases for the production of liquid and solid carbon dioxide. Another important process is the separation of carbon dioxide from gaseous mixtures obtained by cracking methane for the production of hydrogen. This reaction which is usually effected in the presence of water vapor results in the formation of a gaseous mixture containing approximately 80–82% by volume of hydrogen and 18–20% by volume of carbon dioxide and the separation of these relatively large amounts of carbon dioxide is an important part of that process.

It is an object of my invention to employ mixtures of nitrogen bases and water for absorbing normally gaseous acidic compounds, such as sulfur dioxide, hydrogen sulfide, carbon dioxide, hydrogen cyanide and the like in order to separate such gases from other gases contained in gaseous mixtures.

It is a further object to employ complex mixtures of nitrogen bases and water, alcohols or aqueous alcoholic solutions which complex mixtures of nitrogen bases possess a high reactivity for the acid gas to be absorbed to form salts or addition compounds which are easily decomposed by heat thus regenerating the original nitrogen bases. Another object is to employ a cyclic process for the absorption and separation of acid gases from gaseous mixtures and regeneration of the absorption solution.

It is another object of my invention to employ complex mixtures of hydrogenated nitrogen bases and water for the absorption of acid gases.

It is a more particular object of my invention to provide a process which is applicable to the separation of acid gases from gaseous mixtures and to prepare an absorption solution for use in said process which is most efficient for the absorption of a given acid gas by a fractionation procedure applied to crude nitrogen bases obtained from petroleum, coal tar, bone oil or mixtures of these nitrogen bases, to hydrogenated nitrogen bases or to mixtures of the crude nitrogen bases and hydrogenated nitrogen bases the fractionation being designed to select and segregate those particular nitrogen bases which meet the requirements for absorption capacity and regeneration ability set forth herein.

The use of nitrogen bases and the related aromatic amines for the absorption of acidic gases is not new. Some aromatic amines and organic nitrogen bases which have heretofore been employed for the absorption of sulfur dioxide, for example, are aniline and its homologs (British Patent No. 371,888), dimethylaniline (U. S. Patent No. 2,186,453), and quinoline (U. S. Patent No. 1,972,074). The absorption of sulfur dioxide with nitrogen bases in the presence of liquid water and the dissociation or regeneration of the water-soluble nitrogen base-sulfurous acid compound can be represented by the equation:

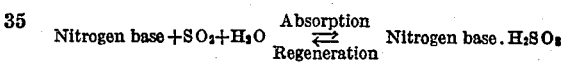

Aliphatic amines and aliphatic amino alcohols have been used for the extraction of hydrogen sulfide and carbon dioxide. Thus compounds such as the mono-, di-, and tri-ethanolamines have been used for these purposes. These compounds differ from the compounds generally classified as nitrogen bases for the term nitrogen bases is generally applied to compounds having a nitrogen atom in the ring structure. The nitrogen bases referred to herein are those heterocyclic nitrogen-containing compounds in which a nitrogen atom forms part of the ring structure.

In general, only one or a mixture of two nitrogen bases or other organic bases have heretofore been used in any mixture for absorbing acid gases. When employing mixtures consisting of a large number of nitrogen bases and water, difficulty has hitherto been encountered in obtaining those nitrogen bases which have a high reactivity for the particular gas being separated and an ease of regeneration of the spent solution to reform the free nitrogen bases by the application of heat.

By fractionating complex mixtures of nitrogen bases into various cuts, I have found that certain of the cuts possess somewhat desirable absorption and regeneration properties. This fractionation to separate the desirable complex mixture of nitrogen bases, however, is a tedious and wasteful process, for it affords inadequately by physical means what I now am able to obtain very efficiently, economically, and simply by chemical means. Thus I have discovered that mixtures of nitrogen bases which possess the previously mentioned desirable properties can be obtained by a simple chemical process and can be subsequently used in a cyclic process for absorbing sulfur dioxide or hydrogen sulfide or carbon dioxide from gases containing the same.

According to my invention, the crude nitrogen bases obtained from petroleum, coal tar, bone oil or mixtures of these without previous purification and fractionation are mixed with water and this mixture is conducted into a suitable gas absorption apparatus, where adequate means for intimate contact of a gaseous mixture containing an acid gas and nitrogen base-water mixture can be obtained. It is preferable to employ the absorption tower to be used for the cyclic absorption of the gaseous mixture, or a tower of similar design, and the same concentration of acid gas as will be used in the cyclic process, since it is desirable to simulate the absorption conditions as closely as possible. The gaseous mixture to be stripped of acid gas is passed countercurrent to the crude nitrogen base-water mixture for a suitable time and at a relatively low temperature. Thus, the time and temperature as well as the liquid and gas velocities should be substantially the same as will be realized in the cyclic process for the absorption of the acid gas, so as to obtain substantially the same absorption coefficients and other controlling conditions and thus obtain those nitrogen bases from the complex mixture which possess the desired reactivity, so as to be usable under the cyclic operating conditions. The non-basic impurities in the crude, complex nitrogen base mixture, as well as those bases which did not form a water-soluble compound with the acid gas, are readily removed by a liquid gravity separator as an oil less dense than the aqueous layer. Those nitrogen bases which are found with the non-basic impurities are mostly the weaker bases whose salts formed with the acid gas are hydrolyzed or dissociated to the original bases during the absorption operation and consequently cannot be used for this process in their present form. These acids may be hydrogenated as indicated hereinbelow to increase their basicity and returned as feed to the absorber alone or together with crude nitrogen bases. The water phase containing the dissolved nitrogen base addition compounds or salts is now heated to approximately its boiling point for any predetermined time period, preferably the same length of time as will be used in the cyclic operating conditions for absorbing the acid gas. The nitrogen bases which are dissociated from their addition compounds by this heating separate as an oil less dense than the aqueous layer from which they may be readily separated and used in the subsequent cyclic absorption and regeneration process. The aqueous layer contains some nitrogen bases which were not dissociated by the heating process (viz., stronger bases than desired); consequently, they are not usable in the cyclic process and are discarded.

In addition to the crude nitrogen bases as indicated hereinabove, I may prefer to use a mixture of crude nitrogen bases from any of the sources indicated which has been hydrogenated to produce the corresponding saturated compounds. Thus the crude nitrogen bases obtainable may consist of pyridine or substituted pyridines, such as the alkyl pyridines and quinoline or the substituted quinolines, such as the alkyl quinolines. Thus pyridine having the formula $C_5H_5N$ or the substituted pyridines having the formula $C_5R_5N$, where R is hydrogen or an organic substituent, may react with three molecules of hydrogen to give the corresponding saturated derivatives having the formulas $C_5H_{10}NH$ and $C_5R_{10}NH$, respectively. Correspondingly quinoline or the alkyl quinolines having the formulas $C_9H_7N$ and $C_9R_7N$, respectively, react with five molecules of hydrogen to produce the corresponding saturated derivatives having the formulas $C_9H_{16}NH$ and $C_9R_{16}NH$, respectively, where R is hydrogen or an alkyl radical. Pyridine, quinoline and the substituted pyridines and quinolines may be considered to be of the aromatic type of nitrogen base because they consist of the six membered ring compounds or condensed ring compounds having three double bonds in alternate positions in each ring. For purposes of differentiation, the hydrogenated nitrogen bases may be considered as naphthene or naphthenic type nitrogen bases since these compounds correspond to the naphthene hydrocarbons in that they are saturated cyclic compounds.

The hydrogenated nitrogen bases are the preferred bases to be employed in processes for the extraction of weakly acidic gases or gaseous mixtures and are, therefore, preferred for the treatment of gases containing hydrogen sulfide, carbon dioxide, hydrogen cyanide and the like. The improvement which is realized by hydrogenation results from an increase in the basicity of the nitrogen bases. In addition to the increase in basic strength other properties, such as increased water solubility of the base and of salts formed with the base also result.

In general hydrogenation of the nitrogen bases may be effected at relatively low temperatures and high pressures in the presence of hydrogenation catalysts. Pressures from about 25 to 250 atmospheres or above may be successfully employed and temperatures ranging between about 50° C. and 300° C. have been found to be satisfactory. Various catalysts which may be employed include noble metals, such as platinum, palladium, iridium and osmium; the metals of the iron group, particularly nickel and cobalt or compounds of these metals which are capable of being reduced to the metal under hydrogenating conditions, such as the oxides, sulfides and the like; and other metals, such as copper, magnesium, molybdenum, tin, or compounds of these metals, such as the oxides or sulfides. The sulfides are particularly effective when the nitrogen bases contain sulfur compounds, such as mercaptans and the like. These catalysts are generally supported on some suitable carrier, such as asbestos, charcoal, alumina, etc., as is well understood by those skilled in the art.

Hydrogenation is effected with gaseous hydrogen in the presence of one of the above-mentioned catalytic materials and preferably the hydrogenation is effected in the presence of liquid or gaseous ammonia. The ammonia appears to increase the rate of hydrogenation and decreases the rate of the reaction leading to the decomposition of nitrogen bases and thus increases yields of hydrogenated products. Amounts of ammonia may be varied over a wide range, however, in general a mixture of approximately 10% by volume of ammonia and 90% by volume of hydrogen is particularly effective.

The selection of the particular nitrogen bases or hydrogenated nitrogen bases or mixtures of nitrogen bases and hydrogenated nitrogen bases to be used in my extraction process will depend upon the particular acid gas being handled. In the case of sulfur dioxide which is a relatively strongly acid gas, with a dissociation constant in aqueous solution at 25° C. of $1.7 \times 10^{-2}$ for the first hydrogen, the nitrogen bases themselves may be satisfactorily employed although some improvement may be gained by including some hydrogenated nitrogen bases with the crude nitrogen bases. In the case of carbon dioxide which in aqueous solution forms an acid having dissociation constant of about $3 \times 10^{-7}$ for the first hydrogen or of hydrogen sulfide the aqueous solution of which has a dissociation constant of only $9.1 \times 10^{-8}$ the hydrogenated nitrogen bases are found to be far superior to the crude nitrogen bases. It is even more important that the hydrogenated nitrogen bases be employed in the case of the extremely weak acid gases, such as hydrogen cyanide which has a dissociation constant in aqueous solution of $7.2 \times 10^{-10}$. The method of selection of the particular bases most desirably employed in any given case will be apparent from the description of the invention given hereinbelow.

The acid gases which I may extract from gaseous mixtures are those acid gases which form acidic aqueous solutions and in which solutions have dissociation constants less than about $2 \times 10^{-2}$. In general, they are the normally gaseous acidic compounds which may be readily volatilized from aqueous solutions. These acid gases may be of the type of hydrogen sulfide which apparently dissolves in water forming a relatively simple aqueous solution which solution is termed hydro-sulfuric acid or hydrogen cyanide which forms an aqueous solution known as hydrocyanic acid. The acid gases may also be of the anhydride type which apparently react with water to form acids. Examples of this type are carbon dioxide and sulfur dioxide. Although these gases form acids in aqueous solution the acids so formed are readily decomposed to form the anhydride and water according to the following equations:

$$H_2CO_3 \rightarrow H_2O + CO_2 \uparrow$$
$$H_2SO_3 \rightarrow H_2O + SO_2 \uparrow$$

and the anhydride gases may be readily volatilized from the solution.

The hydrogenated mixtures of nitrogen bases described herein are particularly valuable for use in extracting the weaker acidic gases, such as carbon dioxide, hydrogen sulfide, hydrogen cyanide, and the like and thus may be preferred for extracting acidic gases having dissociation constants in water solution of less than about $1 \times 10^{-5}$.

Other objects, features and advantages of my invention will be apparent to those skilled in the art from the following description as applied to the separation of hydrogen sulfide from a petroleum cracking still gas. The process here described is similar to that described and illustrated by a drawing in my copending application Serial No. 407,240, now Patent No. 2,370,020, issued February 20, 1945, and is desirably carried out in the apparatus illustrated therein.

In carrying out my process, two each of the following are used: countercurrent gas absorbers, gravity liquid separators, gas-liquid separators, heaters and coolers. The gas or gaseous mixture containing an acid gas, such as hydrogen sulfide, are passed into one absorber at a point near the bottom of the absorber and meet countercurrently the crude nitrogen bases and/or the hydrogenated nitrogen bases introduced into the same absorber along with water at a point near the top of the absorber. The hydrogen sulfide free gases leave the system at the top of the absorber and the fat absorption liquid comprising spent nitrogen bases and/or hydrogenated nitrogen bases is withdrawn from the bottom of the absorber and pumped into a gravity liquid separator. In this separator the unreacted nitrogen bases separate as a top oily layer and are removed from the top of the separator. The aqueous layer is withdrawn from the bottom of the separator and pumped to a heater where the nitrogen base-hydrogen sulfide addition compounds or salts are decomposed by heating the aqueous solution which passes through the heater and the heated mixture is passed into a gas-liquid separator in which hydrogen sulfide is evolved and passes out of the top of the separator in gaseous form. The warm nitrogen base-water mixture is now passed to a cooler and then to a second gravity liquid separator where the water containing dissolved nitrogen base-hydrogen sulfide addition compounds which did not decompose in the heat treatment are withdrawn as bottoms from said second gravity liquid separator.

The upper oily layer in the second gravity liquid separator comprising the desired nitrogen bases is passed through a line where it is mixed with water and into a second countercurrent gas absorber at a point near the top of the absorber. In this absorber the nitrogen base-water mixture is passed countercurrently to the gases containing hydrogen sulfide which are introduced at a point near the bottom of the absorber and wherein the hydrogen sulfide contained in the gases is absorbed by the liquid mixture containing the nitrogen bases. The gases leave the absorber from a point near the top and are substantially free from hydrogen sulfide. The spent nitrogen bases leave the bottom of the absorber and are transported by a pump through a second heater where the hydrogen sulfide-nitrogen base compounds are decomposed by heating the solution. The heated mixture is then passed into a second gas liquid separator when the hydrogen sulfide is liberated and leaves through a line near the top of the separator in gaseous form. The regenerated absorbing liquid containing the nitrogen bases and water is passed through a second cooler where the mixture is cooled to substantially room temperature. The cooled nitrogen base-water mixture is transferred by pump to the top of the second countercurrent gas absorber, thus completing the cycle. Make-up water may be added to the system at the point where the recycled nitrogen base-water mixture enters the second absorber in order to keep the amount of water used substantially constant.

In carrying out the operations in the two absorption towers and in the two regeneration units it is preferable to maintain substantially identical conditions of operations, such as temperature and pressure of absorption, ratio of nitrogen bases and/or hydrogenated nitrogen bases to water, relative gas and liquid flow rates, ratio of hydrogen sulfide to the gases in the gaseous feed stock to be treated and temperature and pressure of regeneration. Preferably a portion of the gas which is later to be freed of acidic gaseous constituents, such as hydrogen sulfide, will be used in the first absorber for the preparation of the particular fraction of nitrogen bases and/or hydrogenated nitrogen bases which are subsequently to be employed in the extraction process. By maintaining identical conditions in the two absorption towers and in the two regeneration units, and by using the same gas in the two absorption towers the nitrogen bases and/or hydrogenated nitrogen bases employed in the second absorber are those which are strong enough to react with the particular acid gas to be removed and yet not strong enough that the addition compounds with the nitrogen bases and/or hydrogenated nitrogen bases which are formed during the absorbing step fail to decompose or dissociate during the heating or reaction step.

In general I prefer to use those nitrogen bases obtained from petroleum in preference to those obtained from the distillation of coal and the like. The petroleum nitrogen bases consist primarily of alkyl substituted pyridines and quinolines and, in fact, are substantially free from the unsubstituted pyridine and quinoline. The complex nitrogen base mixture which I prefer to employ in my process for separating sulfur dioxide from gases is composed of a great many nitrogen bases, a few of which have been identified as 2,3-dimethylquinoline, 2,4-dimethylquinoline, 2,3,8 - trimethylquinoline, 2,4,8-trimethylquinoline, 2,3 - dimethyl-8-n-propylquinoline, 2,3,4,8 - tetramethylquinoline, 2,3,4-tri-8 - diethylquinoline, 2,3 - dimethyl-4-ethyl-8-n-propylquinoline, 2,3,8-trimethyl-4-ethylquinoline, 2,4-dimethyl-8-s-butylquinoline, 2,3 - dimethyl-4, 8 - diethylquinoline, 2,3 - dimethyl-D-ethyl-8-n-propylquinoline, 2,3,4-trimethyl-8-i-propylquinoline. In addition to the above, the complex mixture contains naphthenic as well as fused ring types of nitrogen bases. In general, the complex mixture is free from nitrogen bases heretofore employed for separating acidic gaseous compounds from gases such as pyridine and quinoline. It is also free from related compounds, such as aniline, dimethylaniline and like aromatic amines. It is also free from alkylamines and amino alcohols.

The naphthenic types of nitrogen bases are present to a certain extent in the crude nitrogen bases and to appreciable extents in the hydrogenated crude nitrogen bases and, as indicated hereinabove, hydrogenation converts the aromatic type of nitrogen bases, such as the pyridines and quinolines to saturated cyclic nitrogen bases. Depending upon the degree of hydrogenation, the proportion of aromatic type to naphthenic type nitrogen bases present in any given mixture of nitrogen bases to be employed can be varied within rather wide limits. Thus it is possible to prepare a hydrogenated mixture in which only a small percentage of the nitrogen base molecules are converted to the naphthenic type and, on the other hand, it is possible by means of extensive hydrogenation to convert substantially all of the nitrogen bases into the naphthene nitrogen base form.

By way of example, the following kinds of nitrogen bases and conditions have been employed in separating hydrogen sulfide, carbon dioxide and sulfur dioxide from gaseous mixtures containing these acidic gases. Nitrogen bases were obtained by extracting a bottoms from the distillation of a kerosene Edeleanu extract from petroleum with a dilute solution of sulfuric acid. Kerosene extract bottoms is a well known material recovered as a by-product from the liquid sulfur dioxide extraction of kerosene fractions in the production of high quality kerosene from naphthenic kerosene distillate. The sulfuric acid solution containing sulfuric acid salts of nitrogen bases was made alkaline with caustic solution and steam distilled, the nitrogen bases being recovered as an oily layer from the overhead distillate. The reactions involved in extracting nitrogen bases with sulfuric acid and liberating the nitrogen bases from the sulfuric acid solution may be represented by the following equations:

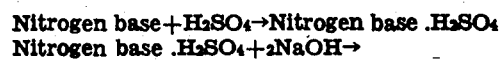

Nitrogen base$+H_2SO_4\rightarrow$Nitrogen base $.H_2SO_4$
Nitrogen base $.H_2SO_4+2NaOH\rightarrow$
$\quad$ Nitrogen base$+Na_2SO_4+2H_2O$ The crude mixture of nitrogen bases recovered in this manner from kerosene extract bottoms had an A. P. I. gravity of 16.0 and a refractive index of $1.5265_D{}^{20}$. This mixture of nitrogen bases has been employed in my process and also this mixture has been hydrogenated to various degrees and the various hydrogenated mixtures have been employed.

The ratio of nitrogen bases to water in the extraction liquid is preferably about 1:1 although this ratio may be varied between wide limits, the upper limit being reached when the acidic gas-nitrogen base addition compounds crystalize from solution, this being detrimental in the process because of the mechanical difficulties attending the handling of liquids carrying solid particles. Ratios of nitrogen bases to water between about 5:1 and about 0.1:1 may be employed.

Throughout the entire system substantially atmospheric pressure has been used and the absorption temperature has been approximately 80° F. although superatmospheric pressures may be satisfactorily employed and higher absorption temperatures may be used. From an economic point of view it is preferable to operate the absorption unit at approximately ordinary atmospheric temperatures. However, in some instances at least, improved absorption may be realized by operating at somewhat lower temperatures, such as 50° F. to 60° F. or even lower. The temperature of regeneration has varied from 190° F. to 210° F. although it is possible to regenerate at somewhat higher temperatures, such as 250° F. or even higher by operating the regeneration stage under superatmospheric pressures. The time for regeneration at temperatures of 190° F. to 210° F. has varied from five to fifteen minutes. A prolonged regeneration period does not substantially affect the yield of acidic gas or of nitrogen bases, however, the longer the regeneration period the greater will be the loss of nitrogen bases by distillation in the presence of water, i. e., steam distillation, and the greater will be the loss of water. Nitrogen bases which are lost during the regeneration may, however, be quantitatively recovered by contacting the evolved acidic gas with a dilute solution of sulfuric acid and the nitrogen bases may be recovered from this solution in the manner indicated hereinabove.

Gases which may be satisfactorily treated for removal of acidic gases have contained wide ranges of percentages of the acid gas. The percentage of acid gas removed varies considerably depending upon absorption conditions, such as temperature, pressure, rates of gas and liquid flow, ratio of nitrogen bases to water in the absorption solution, etc. Gases containing 5% to 10% of sulfur dioxide have been reduced to less than 0.1% of sulfur dioxide. Gases containing 1,000 grains of hydrogen sulfide per 100 cubic foot have been reduced to a hydrogen sulfide content of 5 to 15 grains per 100 cubic foot. Also gases containing 10% to 20% of carbon dioxide have been reduced to less than .2% of carbon dioxide. These data apply to one pass treatments and the removal may be made substantially complete in any instance by recycling the once treated gas or by treatment in a second similar extraction stage.

Although the use of aqueous mixtures of nitrogen bases have been indicated as the absorption solution I may employ other solvents in place of water. Thus I may use alcoholic mixtures of nitrogen bases using preferably the low molecular weight aliphatic alcohols, such as methanol, ethanol, propanol, isopropanol, the various isomeric butanols and possibly some of the higher molecular weight aliphatic alcohols. Also I may use glycol or other polyhydric alcohols. I may also use aqueous alcoholic solutions with my mixture of nitrogen bases where the ratio of water to alcohol may vary over wide limits from substantially pure alcohol at one extreme to substantially pure water at the other extreme.

The foregoing description of my invention is merely illustrative of one mode of carrying out my invention and is not to be taken as limiting as many variations may be made therein as will be recognized by those skilled in the art which are within the scope of the following claims.

I claim:

1. A process for separating an acid gas from a gaseous mixture consisting of acid gases having an ionization constant in aqueous solution of not more than about $3 \times 10^{-7}$ and non-acidic gases, which comprises contacting said gaseous mixture with an aqueous mixture of nitrogen bases and thereby reacting said nitrogen bases with said acid gas contained in said gaseous mixture and subsequently heating the resulting aqueous solution of reacted nitrogen bases to dissociate said reacted nitrogen bases and liberate said acid gas therefrom, said nitrogen bases contained in said aqueous mixture of nitrogen bases being obtained by a series of steps involving contacting an aqueous mixture of a crude mixture of nitrogen bases with the same gas from which it is subsequently desired to separate said acid gas under substantially the same conditions as employed in said first named contacting, thereby reacting a portion of said crude mixture of nitrogen bases with the acid gas contained in said gaseous mixture, then separating unreacted nitrogen bases from the aqueous solution of reacted nitrogen bases, heating said aqueous solution of reacted nitrogen bases under substantially the same conditions employed in said first named heating thereby dissociating a portion of said reacted nitrogen bases and subsequently separating said dissociated nitrogen bases to be used in said process from the aqueous solution of undissociated reacted nitrogen bases, said acid gas being one which is readily volatilized from aqueous solutions.

2. A process as in claim 1 in which said acid gas is hydrogen sulfide.

3. A process as in claim 1 in which said acid gas is carbon dioxide.

4. A process as in claim 1 wherein said crude mixture of nitrogen bases is a crude mixture of hydrogenated nitrogen bases.

5. A process for separating an acid gas from a gaseous mixture containing the same which comprises contacting said gaseous mixture with an aqueous mixture of nitrogen bases comprising hydrogenated nitrogen bases and thereby reacting said nitrogen bases comprising hydrogenated nitrogen bases with said acid gas contained in said gaseous mixture and subsequently heating the resulting aqueous mixture of reacted nitrogen bases comprising hydrogenated nitrogen bases to dissociate said reacted nitrogen base comprising hydrogenated nitrogen bases and liberate said acid gas therefrom, said nitrogen bases comprising hydrogenated nitrogen bases being obtained by a series of steps involving contacting a crude mixture of nitrogen bases comprising hydrogenated nitrogen bases with the same gaseous mixture from which it is subsequently desired to separate said acid gas under substantially the same conditions as employed in the first named contacting thereby reacting a portion of said crude mixture of nitrogen bases comprising hydrogenated nitrogen bases with the acid gas contained in said gaseous mixture, then separating unreacted nitrogen bases comprising hydrogenated nitrogen bases from the reacted nitrogen bases comprising hydrogenated nitrogen bases, heating said reacted nitrogen bases comprising hydrogenated nitrogen bases under substantially the same conditions employed in said first named heating thereby dissociating a portion of said reacted nitrogen bases comprising hydrogenated nitrogen bases and subsequently separating said dissociated nitrogen bases comprising hydrogenated nitrogen bases to be used in said process from said undissociated reacted nitrogen bases comprising hydrogenated nitrogen bases, said acid gas having a dissociation constant in aqueous solutions of less than about $2 \times 10^{-2}$.

6. A process for separating an acid gas from a gaseous mixture containing the same which comprises contacting said gaseous mixture with an aqueous mixture of hydrogenated nitrogen bases and thereby reacting said hydrogenated nitrogen bases with said acid gas contained in said gaseous mixture and subsequently heating the resulting aqueous solution of reacted hydrogenated nitrogen bases to dissociate said reacted hydrogenated nitrogen bases and liberate said acid gas therefrom, said hydrogenated nitrogen bases contained in said aqueous mixture of hydrogenated nitrogen bases being obtained by a series of steps involving contacting an aqueous mixture of a crude mixture of hydrogenated nitrogen bases with the same gas from which it is subsequently desired to separate said acid gas under substantially the same conditions as employed in said first named contacting thereby reacting a portion of said crude mixture of hydrogenated nitrogen bases with the acid gas contained in said gaseous mixture, then separating unreacted hydrogenated nitrogen bases from the aqueous solution of reacted hydrogenated nitrogen bases, heating said aqueous solution of reacted hydrogenated nitrogen bases under substantially the same conditions employed in said first named heating thereby dissociating a portion of said reacted hydrogenated nitrogen bases and subsequently separating said dissociated hydrogenated nitrogen bases to be used in said process from the aqueous solution of undissociated reacted hydrogenated nitrogen bases.

7. A process for the treatment of a gaseous mixture consisting of acid gases having an ionization constant in aqueous solution of not more than about $3 \times 10^{-7}$ and non-acidic gases, to separate the acid gas from other gaseous compounds contained therein, comprising contacting said gaseous mixture with an absorbing liquid which absorbs said acid gas, said absorbing liquid comprising water and a mixture of nitrogen bases, and heating said absorbing liquid in which said acid gas has been absorbed to liberate said absorbed acid gas, said mixture of nitrogen bases being obtained from a more complex mixture of nitrogen bases by a series of steps involving contacting the said gaseous mixture from which it is subsequently desired to separate said acid gas with an absorbing liquid comprising water and said more complex mixture of nitrogen bases under substantially the same conditions employed in said first named contacting to cause some of the nitrogen bases to react with said acid gas, separating the unreacted nitrogen bases from the aqueous solution of reacted nitrogen bases, heating said aqueous solution of reacted nitrogen bases under substantially the same conditions employed in said first named heating to dissociate some of said reacted nitrogen bases thereby liberating said acid gas and separating said dissociated nitrogen bases to be used in said treatment thereby leaving undissociated reacted nitrogen bases in said aqueous solution.

8. A process for the treatment of a gaseous mixture containing an acid gas to separate the acid gas from other gaseous compounds contained therein comprising contacting said gaseous mixture with an absorbing liquid which absorbs said acid gas, said absorbing liquid comprising water and a mixture of hydrogenated nitrogen bases, and heating said absorbing liquid in which said acid gas has been absorbed to liberate said absorbed acid gas, said mixture of hydrogenated nitrogen bases being obtained from a more complex mixture of hydrogenated nitrogen bases by a series of steps involving contacting the said gaseous mixture from which it is subsequently desired to separate said acid gas with an absorbing liquid comprising water and said more complex mixture of hydrogenated nitrogen bases under substantially the same conditions employed in said first named contacting to cause some of the hydrogenated nitrogen bases to react with said acid gas, separating the unreacted hydrogenated nitrogen bases from the aqueous solution of hydrogenated nitrogen bases, heating said aqueous solution under substantially the same conditions employed in said first named heating to dissociate some of said reacted hydrogenated nitrogen bases thereby liberating said acid gas and separating said dissociated hydrogenated nitrogen bases to be used in said treatment thereby leaving undissociated reacted hydrogenated nitrogen bases in said aqueous solution.

9. A process as in claim 8 in which said absorbing liquid comprising water and a mixture of hydrogenated nitrogen bases consists of water, alcohol and a mixture of hydrogenated nitrogen bases.

10. A process of recovering an acidic gas from a gaseous mixture containing the same which comprises contacting said gaseous mixture with hydrogenated nitrogen bases in the presence of water to absorb said acidic gas, heating the aqueous absorption liquid to evolve said acidic gas, cooling said heated absorption liquid and recycling said absorption liquid to the contacting step of said process, said hydrogenated nitrogen bases being obtained from a crude mixture of nitrogen bases by a series of steps involving hydrogenating said crude mixture of nitrogen bases, contacting the same gaseous mixture from which it is subsequently desired to recover said acidic gas with the hydrogenated crude mixture of nitrogen bases in the presence of water under conditions substantially the same as those employed in said first named contacting, thereby reacting a portion of said hydrogenated crude mixture of nitrogen bases with said acidic gas, separating unreacted hydrogenated nitrogen bases from the aqueous solution of reacted hydrogenated nitrogen bases, heating said last named aqueous solution under substantially the same conditions employed in said first named heating thereby dissociating a portion of said reacted hydrogenated nitrogen bases and then separating said dissociated hydrogenated nitrogen bases to be used in said acidic gas recovery process from the aqueous solution of undissociated reacted nitrogen bases.

11. A process as in claim 10 in which said acidic gas is hydrogen sulfide.

12. A process as in claim 10 in which said acidic gas is carbon dioxide.

13. A process as in claim 10 in which said acidic gas is hydrogen cyanide.

THOMAS F. DOUMANI.

REFERENCES CITED

The following references are of record in the file of this patent:

UNITED STATES PATENTS

| Number | Name | Date |
|---|---|---|
| Re. 18,958 | Bottoms | Sept. 26, 1933 |
| 1,882,289 | Lush | Oct. 11, 1932 |
| 1,951,992 | Perkins | Mar. 20, 1934 |
| 2,065,112 | Bottoms | Dec. 22, 1936 |
| 2,106,446 | Bottoms | Jan. 25, 1938 |
| 2,143,393 | Ulrich et al. | Jan. 10, 1939 |
| 2,177,068 | Hutchinson | Oct. 24, 1939 |
| 2,251,216 | Woodhouse | July 29, 1941 |
| 2,370,020 | Doumani | Feb. 20, 1945 |
| 2,388,135 | Frey | Oct. 30, 1945 |
| 2,388,156 | Kelley | Oct. 30, 1945 |
| 2,395,509 | Shaw | Feb. 26, 1946 |

Certificate of Correction

Patent No. 2,486,778                                               November 1, 1949

THOMAS F. DOUMANI

It is hereby certified that errors appear in the printed specification of the above numbered patent requiring correction as follows:

Column 7, lines 42, 43 and 44, for "2,3,4-tri-8-diethylquinoline, 2,3-dimethyl-4-ethyl-8-n-propylquinoline" read *2,3,4-trimethyl-8-ethylquinoline, 2,3,4-trimethyl-8-n-propylquinoline*; column 7, line 46, for "D-ethyl" read *4-ethyl*;

and that the said Letters Patent should be read with these corrections therein that the same may conform to the record of the case in the Patent Office.

Signed and sealed this 21st day of March, A. D. 1950.

[SEAL]

THOMAS F. MURPHY,
*Assistant Commissioner of Patents.*